(12) United States Patent
Volkerink et al.

(10) Patent No.: US 11,700,063 B2
(45) Date of Patent: Jul. 11, 2023

(54) APPLIANCE REMOTE CONTROL

(71) Applicant: Volley Base, Inc., Palo Alto, CA (US)

(72) Inventors: Erik Volkerink, Palo Alto, CA (US); Miriam van Ringelestijn, Palo Alto, CA (US)

(*) Notice: Subject to any disclaimer, the term of this patent is extended or adjusted under 35 U.S.C. 154(b) by 0 days.

(21) Appl. No.: 17/687,436

(22) Filed: Mar. 4, 2022

(65) Prior Publication Data

US 2022/0286207 A1 Sep. 8, 2022

Related U.S. Application Data

(60) Provisional application No. 63/156,790, filed on Mar. 4, 2021.

(51) Int. Cl.
  *H04B 10/50* (2013.01)
  *H04B 10/291* (2013.01)
  *H04B 10/69* (2013.01)

(52) U.S. Cl.
  CPC ......... *H04B 10/502* (2013.01); *H04B 10/291* (2013.01); *H04B 10/6911* (2013.01)

(58) Field of Classification Search
  CPC ............... H04B 10/502; H04B 10/291; H04B 10/6911; Y02B 20/40
  USPC ....................................................... 398/182
  See application file for complete search history.

(56) References Cited

U.S. PATENT DOCUMENTS

| | | | | |
|---|---|---|---|---|
| 6,570,524 | B1* | 5/2003 | Mullaly | H04B 10/1141 398/107 |
| 9,215,394 | B2* | 12/2015 | Barnett | H04L 12/282 |
| 9,842,491 | B2* | 12/2017 | Ariel | A63F 13/86 |
| 11,109,471 | B1* | 8/2021 | Recker | H02J 13/00017 |
| 2008/0068207 | A1* | 3/2008 | Elberbaum | G08C 17/02 340/13.25 |
| 2009/0239587 | A1* | 9/2009 | Negron | H04L 12/2836 455/566 |
| 2012/0210268 | A1* | 8/2012 | Hilbrink | G06F 3/0485 235/375 |
| 2012/0288283 | A1* | 11/2012 | Meyer | H04N 21/42206 398/115 |
| 2013/0249679 | A1* | 9/2013 | Arling | G08C 23/04 340/12.22 |
| 2016/0119741 | A1* | 4/2016 | Huang | H04L 12/282 455/41.3 |
| 2017/0041524 | A1* | 2/2017 | Schoenen | H04N 5/2256 |
| 2017/0215261 | A1* | 7/2017 | Potucek | H04L 67/53 |

FOREIGN PATENT DOCUMENTS

| | | | | |
|---|---|---|---|---|
| CN | 103687188 B | * | 9/2015 | ......... H04B 10/116 |
| WO | WO-2012089710 A1 | * | 7/2012 | ......... G08C 17/02 |

* cited by examiner

*Primary Examiner* — Abbas H Alagheband
(74) *Attorney, Agent, or Firm* — Phillip M. Wagner

(57) ABSTRACT

An apparatus embodiment includes a remote control interface unit configured to accept an appliance control code carried in a radio frequency signal transmitted from a smart phone, extract the appliance control code from the radio frequency signal, send the extracted appliance control code to an optical frequency interface, and initiate transmission of an optical frequency signal including the appliance control code to an appliance configured to receive signals from an optical remote control.

7 Claims, 4 Drawing Sheets

Appliance 400

| Television | 402 |
| HVAC | 404 |
| Lighting | 406 |
| Security System | 408 |
| Ceiling Fan | 410 |
| Entertainment System | 412 |
| Cable TV Set Top Box | 414 |
| Satellite TV Set Top Box | 416 |
| Personal Computer | 418 |
| MP3 Player | 420 |
| Video Projector | 422 |
| Audio Amplfier | 424 |
| Video player/recorder | 426 |
| Computer Display | 428 |

Fig. 3

APPLIANCE REMOTE CONTROL

FIELD OF THE INVENTION

Embodiments are generally related to wireless remote controls for operating electrical appliances such as televisions, set top boxes, audio equipment, ceiling fans, and the like.

BACKGROUND

Televisions, stereo systems, ceiling fans, air conditioners, and other appliances may be provided with a wireless remote control. A remote control provides a convenient means for operating an appliance that may be out of reach of a person using the appliance. Acoustic or electromagnetic signals transmitted from the remote control and received and recognized by the associated appliance may select a function to be performed by the appliance. A remote control may provide for simplified operation of an appliance by limiting operational selections offered on the remote control to frequently used functions of the appliance.

Signals emitted by the remote control may include an appliance control code. An appliance control code is a data value corresponding to a command recognized by an appliance being controlled. Each appliance action selectable by a remote control may have a separate appliance control code. Appliance control codes may differ by manufacturer, appliance type, and/or action to be performed by an appliance.

Some remote controls transmit a radio frequency (RF) signal to an appliance to be controlled. A remote control configured to transmit a radio frequency signal to an appliance may be referred to as an RF remote control. Other remote controls transmit an optical frequency signal, for example a light signal with a frequency in the part of the optical spectrum detected by human vision as red light or in the near infrared part of the optical spectrum outside the range of unaided human vision. A remote control configured to transmit an optical frequency signal to an appliance may be referred to as an optical remote control.

RF remote controls transmit RF signals with wavelengths that are several orders of magnitude greater, and therefore substantially lower in frequency, than optical signals transmitted by optical remote controls. RF frequencies use by many RF remote controls may have been selected to pass through walls, furniture, and other objects that could block an optical frequency signal. An appliance configured to respond to a radio frequency remote control signal may not respond to an optical frequency remote control signal, and vice-versa.

Some design features and optical attributes of optical remote controls can make it difficult for a person to point a remote control with sufficient accuracy to reliably control an appliance. For example, it may be difficult for some persons to hold an optical remote control steadily enough for the remote control to maintain line-of-sight communication with the appliance. For some appliances, it may be difficult for a person to determine the location of a light sensor for detecting signals from an optical remote control. A light sensor may be positioned in a part of the appliance that is not along a convenient line-of-sight path from an operating location preferred by an appliance user. An optical remote control having a small light source, e.g., a small light emitting diode (LED), a small exit aperture for emitted light, or a light source with a narrow radiation emission pattern, can be difficult to point at an appliance accurately. An optical window covering a light emitter on an optical remote control may become scratched or smudged, reducing the effective operating range of the remote and possibly impairing appliance control.

A dedicated remote control, i.e., a remote control configured for operation of a particular appliance, may be incapable of controlling other appliances. A lost or damaged remote control may be difficult to repair or replace, especially for appliances no longer being sold or serviced by appliance manufacturers. Some remote controls are small enough to be easily misplaced or use small batteries that must be recharged or replaced frequently.

Remote controls configurable for use with more than one appliance, sometimes referred to as universal remote controls, may store appliance control codes for different brands and/or models of appliances. A universal remote control embeds the appliance control codes recognized by a selected appliance on the signals transmitted from the remote control to the appliance. Some universal remote controls output optical frequency signals, some output RF signals, and others are capable of selectively outputting both optical frequency and RF signals. However, a universal remote control configured to output optical frequency signals may be subject to many of the same problems that affect dedicated optical remote controls, for example problems with line-of-sight communications.

A smart phone may be operable as a universal remote control. A smart phone refers to a cellular telephone having a processor and memory capable of executing application programs operable by a phone user, a graphics-capable display with touch detection, and communications access to the Internet. A universal remote control applications program running on a smart phone may establish control of an appliance through a wireless radio frequency link such as Bluetooth (TM) or wi-fi. However, many smart phones do not include an optical emitter suitable for controlling appliances configured to accept an optical frequency wireless signal. Furthermore, smart phones configured as universal remote controls may fail to recognize when more than one smart phone is communicating with the same appliance, possibly leading to unpredictable control results or conflicts between appliance users.

An optical remote control performs appliance control most reliably when a light emitter on the optical remote control is on an uninterrupted straight-line path to a light detector on the appliance. An uninterrupted straight-line path between an object such as a light emitter and another object such as a light detector may be referred to as a line-of-sight path. For effective remote control, the line-of-sight path must be short enough for the appliance to detect and respond to the intensity of light received from the optical remote control.

The intensity of light detected by a light sensor in an appliance varies with changes in the distance between the remote control and appliance. The intensity of light detected by the light sensor further varies according to an angle between the radiation pattern for the light emitted by an optical remote control and the field of view of the light sensor, with some angles giving better detection of light from the remote control than others. Bouncing the light emitted from an optical remote control off a reflective surface may give acceptable appliance control, possibly at a substantially reduced distance compared to a line-of-sight path. In the absence of a suitable reflecting surface, a sufficiently opaque object intervening between an optical remote control and an appliance, for example an object such as a wall, closed door, or furniture, may block an optical frequency signal from the remote control and prevent effective appliance control. An optical remote control and an appliance are preferably positioned relative to one another with the radiation pattern of the light source on the remote control sufficiently overlapping the field of view of the light detector on the appliance for the appliance to respond to the remote control.

SUMMARY

An example apparatus embodiment includes a remote control interface unit configured for receiving appliance control codes carried in radio frequency signals received from a smart phone and retransmitting the appliance control codes in optical frequency signals sent to an appliance to be controlled from the smart phone. The example remote control interface unit includes a processor; a radio frequency transceiver connected for data communication with the processor, with the radio frequency transceiver configured to receive a radio frequency signal including an appliance control code; and an optical frequency interface connected for data communication with the processor, with the optical frequency interface including a transmitter with a light emitting diode. The transmitter is configured to output from the light emitting diode an optical frequency signal including the appliance control code. The processor is configured to extract the appliance control code from the radio frequency signal, send the appliance control code to the optical frequency interface, and initiate transmission by the light emitting diode of the optical frequency signal including the appliance control code.

The example remote control interface optionally further includes the radio frequency transceiver configured to receive the signal including an appliance control code from a smart phone.

The optical frequency interface further includes a receiver including a light sensor, with the receiver configured to receive an optical frequency signal transmitted from an appliance, and the processor configured to extract from the optical frequency signal transmitted from an appliance a response to the appliance control code. The microprocessor is optionally further configured to send the response to the radio frequency transceiver and initiate communication of the response to a smart phone.

The example remote control interface further optionally includes a memory connected for data communication with the processor, with the memory including a stored user identification value, the processor configured to receive an identification value from a smart phone, and the processor configured to accept the appliance control code from the smart phone when an identification value transmitted by the smart phone and the stored user identification value are a same value. The memory optionally further includes a stored appliance identification value, with the processor configured to send the appliance control code from the smart phone to an appliance having the appliance identification value. The example RCIU preferably does not include components configured to communicate with a cellular telephone network.

BRIEF DESCRIPTION OF THE DRAWINGS

FIG. 3 is a block diagram illustrating examples of appliances configured to receive and respond to optical frequency signals from an optical remote control and/or the example RCIU of FIG. 1 and FIG. 2.

DESCRIPTION

Figure 1:
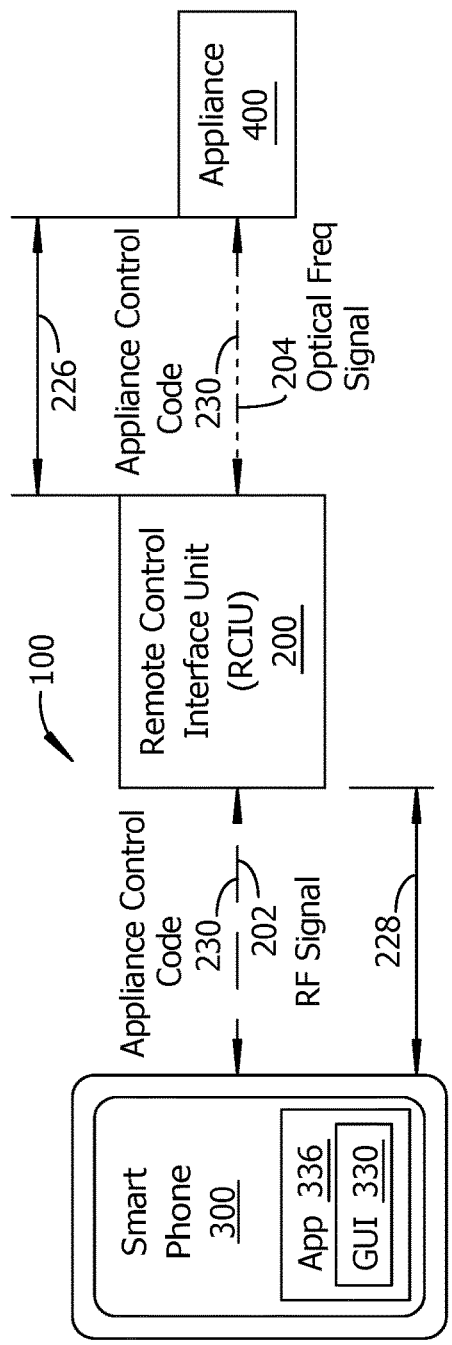
FIG. 1 is a schematic diagram showing an example embodiment of a remote control interface unit (RCIU) configured for exchanging radio frequency signals with a smart phone and optical frequency signals with an appliance, and optionally including an appliance remote control applications program configured for execution on the smart phone.

An example embodiment referred to herein as a remote control interface unit (RCIU) exchanges radio frequency (RF) signals with a smart phone, extracts appliance control codes extracted from the RF signals received from the smart phone, and adds the appliance control codes to an optical frequency signal subsequently transmitted to an appliance configured to respond to an optical remote control but not to an RF remote control. Some embodiments include an optional applications program configured for operation on a smart phone.

The RCIU provides remote operation of an appliance in data communication with the RCIU, where remote operation refers to control of the appliance from a smart phone that is not in mechanical contact with the appliance and not electrically connected to the appliance by a wire or cable. The RCIU is preferably positioned at a stationary location relative to an appliance to be controlled on a line-of-sight path from an optical emitter in the RCIU to an optical signal receiver in the appliance. A smart phone communicating with the stationary RCIU can be moved about during appliance control anywhere within a maximum effective operating distance for communications between an RF transceiver in the smart phone and an RF transceiver in the RCIU. Embodiments of the RCIU therefore overcome many of the problems associated with previously known hand-held optical remote controls, for example by establishing and maintaining a stable, uninterrupted optical frequency signal connection between the RCIU and the appliance being controlled, independent of the availability of a line-of-sight optical signal path between the appliance and the location of a person operating the smart phone to control the appliance.

The maximum effective operating distance for optical signal communications between the RCIU and the appliance adds to the maximum effective operating distance for RF signal communications between the RCIU and the smart phone, substantially increasing a maximum distance over which the appliance can be controlled compared to a maximum control distance for a previously known dedicated optical remote control. Unlike previously known optical remote controls, the RCIU is capable of establishing effective appliance control through walls, furniture, and other objects that prevent effective data communications by optical frequency signals but not by RF signals.

Optical frequency signals generated by the disclosed embodiments may include light in the visible and infrared portions of the electromagnetic spectrum. Optical frequency signals transmitted on light having a frequency outside the portion of the electromagnetic spectrum visible to humans, for example signals in the near-infrared portion of the spectrum, are preferred for appliances that were manufactured to respond to optical remote controls to avoid exposing persons near an RCIU to flashing visible light. Where optical frequency signals output from an RCIU include a visible frequency component, the visible frequency component will preferably be too dim for most people to see. Radio frequency signals detectable by and transmitted from the disclosed embodiments are substantially lower in frequency than optical frequency light signals transmitted by the RCIU to an appliance. As used herein, a maximum effective operating distance for communication of an optical frequency signal refers to a maximum distance at which a light sensor in an appliance to be controlled and/or a light sensor in the RCIU can detect an optical frequency signal and extract appliance control information from the optical frequency signal with at least 95 percent probability of a correct appliance response to a user selection. Similarly, a maximum effective operating distance for communication of an RF signal is a maximum distance at which an RF receiver in an appliance can detect an RF signal and extract appliance control information from the RF signal with at least 95 percent probability of a correct appliance response to a user selection. An optical frequency signal and/or an RF signal is considered to be effectively blocked and appliance control ineffective for a probability of less than 95 percent of a correct appliance response to an appliance control code in the signal.

Embodiments of the RCIU are effective for establishing reliable control of an appliance over greater distances than would be expected for many previously-available remote controls configured to output optical frequency signals. Reliable control as used herein refers to a probability of at least 95 percent of a correct appliance response to an appliance control code in signals transmitted from a smart phone to an RCIU and from the RCIU to the appliance. The maximum effective operating distance for communication of an RF signal between a smart phone and the RCIU adds to the maximum effective distance for communication of an optical frequency signal between the RCIU and an appliance. The examples of an RCIU disclosed herein are further effective for establishing control of an appliance under conditions that would interfere with a remote control configured to output optical frequency signals for appliance control, for example when an object opaque at optical frequencies blocks a line-of-sight path between a remote control and the appliance being controlled. An object is considered to be opaque at optical frequencies when an optical signal from a remote control is sufficiently attenuated by the object to prevent effective control of an appliance from the remote control.

The disclosed embodiments of an RCIU differ from smart phones in that the RCIU does not include circuits and software configured for communicating with a cellular telephone network. Nor does an RCIU include a liquid crystal display supporting a graphical user interface (GUI) and a touch screen as may be found on many smart phones. Furthermore, the light emitting diode (LED) in the RCIU's optical interface is preferably capable of transmitting data at IrDA data rates or faster.

An example apparatus embodiment 100 including an RCIU 200 is shown in the block diagram of FIG. 1. The example RCIU 200 is configured to exchange an RF signal 202 with a smart phone 300 and an optical frequency signal 204 with an appliance 400, in some embodiments in response to selections made in an optional appliance remote control program 336 executing on the smart phone 300. The RF signal 202 transmitted from the smart phone to the RCIU includes an appliance control code 230. The appliance remote control program 336 may also be referred to herein as the applications program 336. The applications program 336 optionally includes a graphical user interface 330 displaying choices of available appliance control functions. The applications program 336 is optionally configured to display information about the appliance 400 and/or information returned from the appliance 400. Appliance control functions presented in the GUI 330 vary according to the features of the appliance to be controlled and optionally depend on an identity code associated with the smart phone and/or a person using the smart phone, with the GUI possibly showing a complete set of operational features of the appliance to some users and limited sets of operational features to other users.

The examples of an RF signal 202 and an optical frequency signal 204 optionally represent bidirectional communications paths, i.e., data may be exchanged in both directions between communicating devices. The RCIU 200 may be placed anywhere along a line-of-sight path within the maximum effective operating distance 226 of the appliance 400. The RCIU 200 may optionally be placed at a location where a direct line-of-sight path to the appliance is not available but a signal reflected from a surface is sufficiently strong for the appliance to respond reliably. The smart phone 300 can establish effective control of the appliance 400 within a maximum effective operating distance 228 of the RCIU 200. As will be explained in more detail with regard to FIG. 5, the smart phone 300 is not limited to line-of-sight communications with the RCIU 200 to establish control of an appliance.

An appliance control function displayed on the smart phone 300 may be selected by a user pressing a touch screen on the phone. A processor in the smart phone retrieves an appliance control code corresponding to the user selection from a table of appliance-specific control codes stored in the smart phone's memory. Appliance-specific control codes may be downloaded from appliance control code databases accessible through the Internet or may be captured by recording signals from a dedicated optical remote for a selected appliance. The selected appliance control code 230 is added to the RF signal 202 and transmitted to the RCIU. Upon detecting the RF signal 220, the RCIU 200 extracts the appliance control code 230 from the RF signal 202, adds the appliance control code 230 to an optical frequency signal 204, and transmits the optical frequency signal 204 including the appliance control code 230 to the appliance 400. The appliance 400 may return a response to the RCIU in the optical frequency signal 204. The RCIU may transmit the appliance's response to the smart phone through the RF signal. 202

An example appliance control code includes digital data values organized as a serial bit sequence. An appliance control code may include, for example, a start bit provided for setting gain in a receiver, a field bit for increasing the number of encoded appliance commands, a control bit to allow the receiving device to recognize successive activations of the same button or touch target on a screen, a group of address bits specifying the address of the appliance to be communicated with, and a group of bits encoding the command to be sent to the appliance to activate a selected appliance function. Other formats for an appliance control code are within the scope of the disclosed embodiments.

In some embodiments, a control code corresponding to an appliance command is stored as a same digital data value in the smart phone and in the RCIU. Alternatively, a control code value stored in the smart phone for activating a selected appliance function and a control code value stored in the RCIU for activating the same appliance function may be different digital values. Control codes may be stored in an RCIU at the time of manufacture or may alternately be downloaded from a smart phone to the RCIU.

Figure 2:
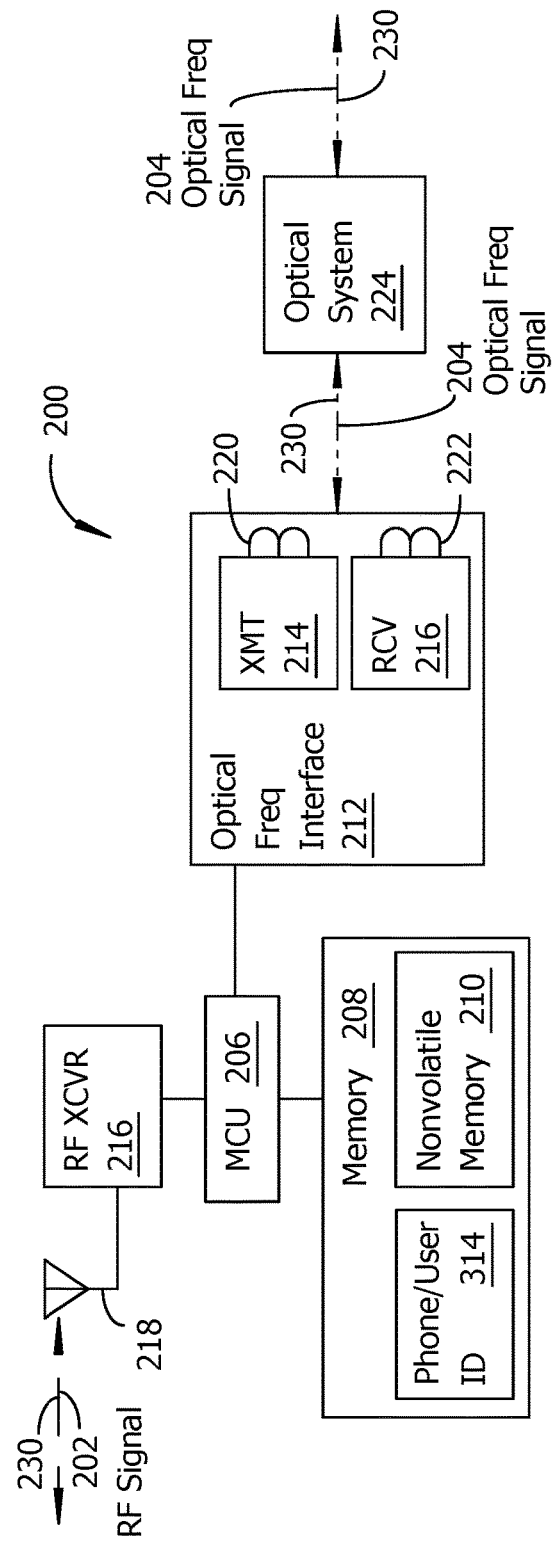
FIG. 2 is a schematic diagram with examples of some features of the RCIU of FIG. 1.

FIG. 2 shows examples of some additional details of the RCIU 200. Operation of the RCIU 200 is directed by a microcontroller (MCU) 206. The MCU 206, for example a computer processor implemented in semiconductor hardware, a programmable logic device, a gate array, or an application-specific integrated circuit, is connected for data communication with an RF transceiver (XCVR) 216, a memory 208, and an optical frequency interface 212. The RF XCVR 216 is electrically connected to an antenna 218, through which the MCU 206 and the smart phone 300 wirelessly communicate the RF signal 202.

Data and program instructions used by the MCU are stored in the memory 208, a part of which may be nonvolatile memory 210 capable of retaining information when power to the RCIU has been turned off. For example, the MCU is configured to extract an appliance control code 230 from the RF signal 202, store the extracted appliance control code in the memory 208, and communicate the extracted appliance control code in data sent to the optical frequency interface 212. The memory 208 optionally includes a stored phone identification value and/or user identification value 314. The stored identification value may be compared with an identification value transmitted by a smart phone. When the store value and the transmitted value are a same value, the processor 205 may initiate and/or accept data and commands from the smart phone.

The optical frequency interface 212 includes an optical transmitter (XMT) 214 which receives the appliance control code and adds the control code to a signal driving one or more light emitting diodes (LED) 220. Light output from the LED 220 represents the optical frequency signal 204 including the appliance control code 230 to be transmitted to the appliance 400. The optical frequency interface 212 optionally includes an optical receiver (RCV) 216 including one or more light sensors 222. Examples of a light sensor 222 include, but are not limited to, a phototransistor and a photodiode. The receiver 216 is capable of detecting an optical frequency signal from an appliance or another source and converting the optical frequency signal to an electrical signal accessible to the MCU. An optical system 224 is optionally included to modify an operating distance 226 and/or a propagation direction of the optical frequency signal 222. Examples of components included in the optical system 224 include, but are not limited to, an optical window, a lens, a mirror, a rigid light pipe, and a flexible fiber optic. An optical system may be advantageous, for example, in improving the communication of appliance control codes and appliance responses between the optical frequency interface 212 and an optical signal emitter and/or sensor on the appliance 400. The optical system 224 may be configured, for example, to collect light emitted from the LED 220 over a large angle of view and concentrate the collected light into a smaller angle of view for transmission to the appliance, thereby increasing the luminous intensity of the LED light at the appliance compared to an optical frequency interface not communicating through an optical system.

Examples of appliances 400 capable of receiving, responding to, and possibly sending, an optical frequency signal are shown in a block diagram in FIG. 3. As previously explained, the RCIU communicates an optical frequency signal 204 to a selected appliance 400. An appliance control code 230 carried in the optical frequency signal may be extracted from the optical frequency signal by the appliance, and the appliance may then perform the function associated with the appliance control code. Examples of appliances 400 suitable for control by the disclosed embodiments 100 include, but are not limited to, a television (TV) 402, an appliance such as a furnace, air conditioner, or thermostat included in a heating, ventilation, and air condition system (HVAC) 404, a lighting control system 406 for dimming lights and turning lights on and off, a security system 408, and a ceiling fan 410. Other examples include an entertainment system 412 such as a home theater system or audio system, a cable TV set top box 414, a satellite TV set top box 416, a personal computer 418, an MP3 player 420, a video projector 422, an audio amplifier 424, a video player and/or recorder 426, and a computer display 428.

Figure 4:
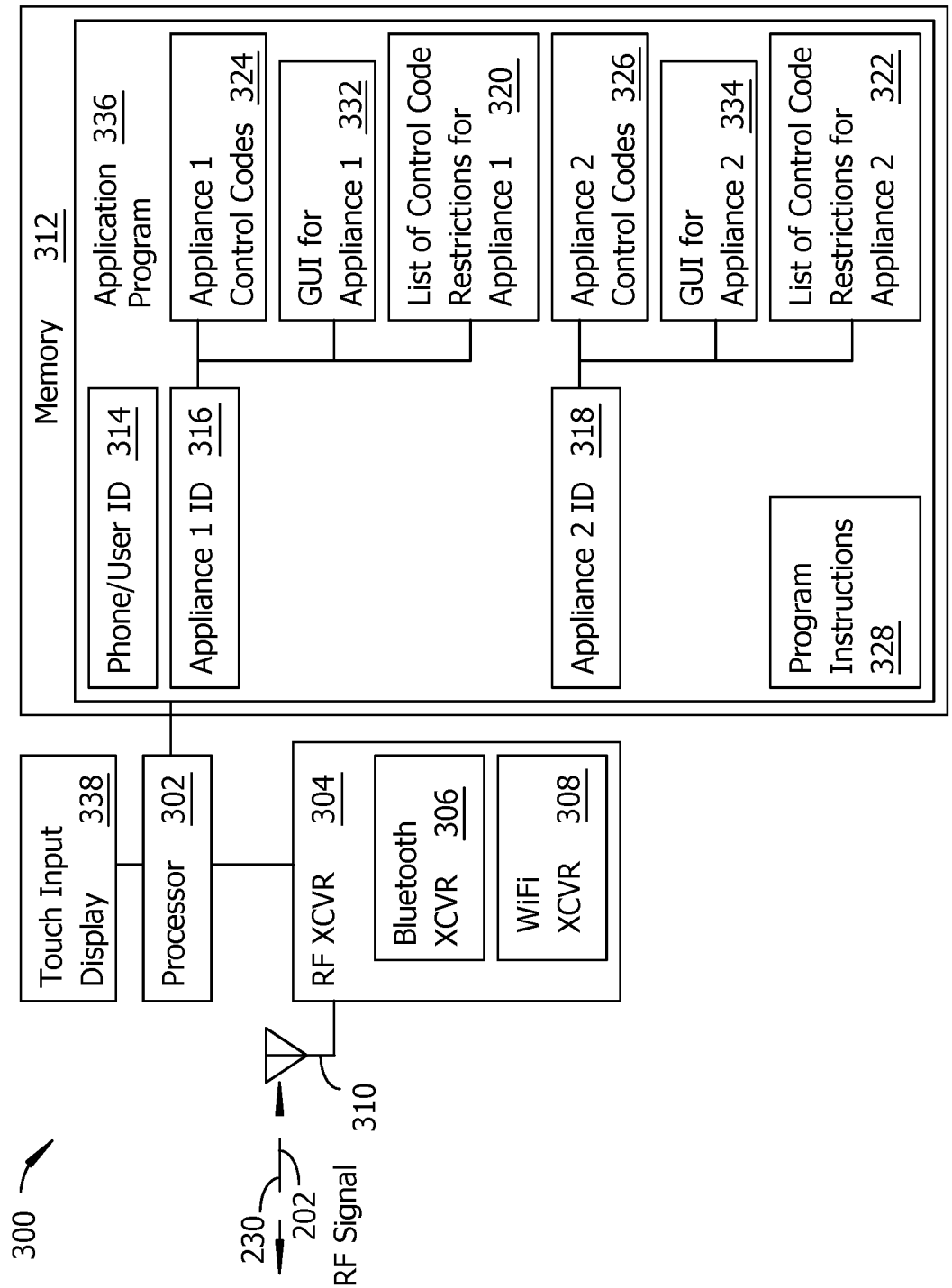
FIG. 4 is a schematic diagram of an example smart phone suitable for use with the disclosed embodiments, further illustrating examples of parameters used by an optional applications program configured to execute in the example smart phone.

Some features of an example smart phone 300 capable of exchanging an RF signal 202 with an embodiment of an extended range remote control 100 are represented in the block diagram of FIG. 4. The example smart phone includes a processor 302 connected for data communication with a touch input display 338, a radio frequency transceiver (RF XCVR) 304, and a memory 312. An antenna 310 connected to the RF XCVR 304 communicates the RF signal 202 with the extended range remote control 100. The RF XCVR 304 optionally includes a Bluetooth (TM) XCVR 306 and/or a wifi XCVR 308.

FIG. 4 illustrates example of some features of the appliance remote control program 336 optionally included with an embodiment 100. The application program 336 is stored in the smart phone memory 312 and includes data, operating parameters, and program instructions 328 recognized by the processor 302. Examples of optional operating parameters include a phone and/or user identification (ID) value 314, which may be a unique identifier assigned to a user of the smart phone 300 or to the phone 300. Other operating parameters include one or more appliance identifiers (316, 318) to associate appliance-specific data with each appliance to be controlled. A first appliance ID 316 optionally includes a list of control codes 324 specific to a first appliance (Appliance 1), display text and graphics associated with a GUI 332 for appliance 1, and an optional list of control code restrictions 320 for appliance 1 and/or user ID 314. For example, a list of control code restrictions may be specified for a selected user ID, with limitations on the times an appliance may be used, a range for volume settings, complete lock-out of appliance use, a list of accessible program channels, and so on. A second appliance (appliance 2) ID 318 has its own associated appliance control codes 326, GUI features 334, and list of control code restrictions relevant to the operation of the second appliance. Any one or more of the operating parameters stored in the example memory 312 of FIG. 4 may also be stored in the memory 208 of the RCIU 200.

Some User IDs 314 may be permitted to take priority over other user IDs in operation of specified appliances, possibly enabling a user to override and/or block appliance operations selected by another user. For example, a user ID 314 assigned to an adult may be given priority for appliance control over a user ID assigned to a child. Alternately, priority for control of an appliance may be assigned to the first user ID to request control of the appliance. Or, a command received from any user ID may be accepted to perform appliance control. A high-priority user ID may optionally assign access priority to other user IDs. Although the example figure shows two appliance IDs (316, 318), the application program 336 may optionally manage access priorities and other parameters for more than two appliances, each appliance with its own set of control codes (324, 326), GUI features (332, 334), and control code restrictions (320, 322).

In some embodiments, the appliance remote control program 336 determines which appliances can be controlled and which appliance functions can be performed according to the value of the user ID 314. An RCIU may optionally be configured to determine which appliance functions can be performed according to the value of the user ID 314.

Figure 5:
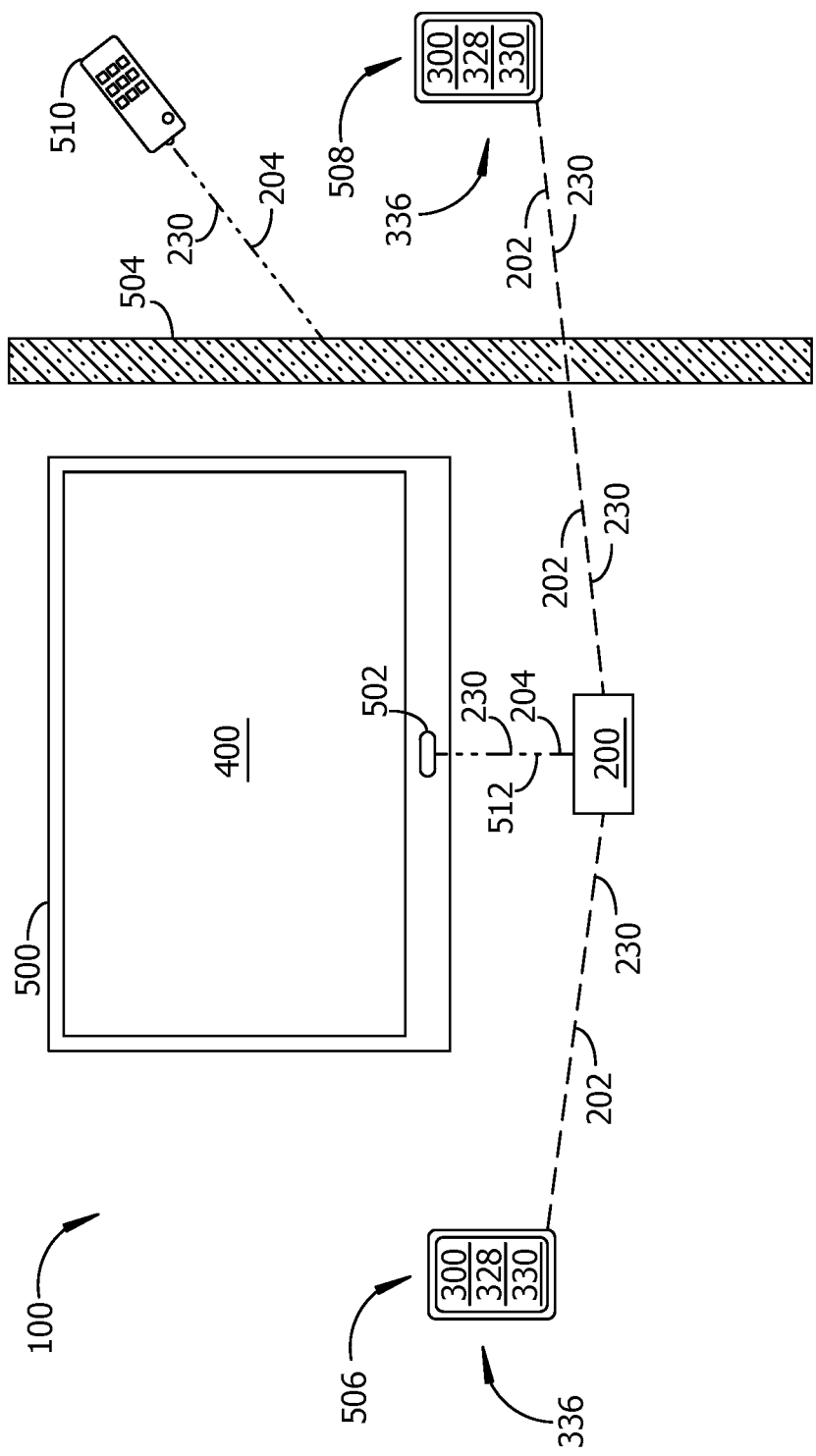
FIG. 5 is a schematic diagram illustrating an example of effective remote control of an appliance by an RCIU receiving RF signals from two smart phones and transmitting optical frequency signals to the appliance, and further illustrating an example of ineffective remote control of the appliance by an optical remote control having an optical frequency output signal blocked by a barrier that does not block radio frequencies.

FIG. 5 illustrates examples of an embodiment 100 in use. An example RCIU 200 is shown as a stand-alone unit not in physical contact with an appliance 400. In the example of FIG. 5, the appliance 400 is an example of a television and/or computer monitor 500. The RCIU 200 is shown in an example of a position selected to establish a line-of-site path 512 of the optical frequency signal 204 from the RCIU to an optical signal receiver 502 on the appliance. An example smart phone 300 positioned on an opposite side of a barrier object 504 from the appliance 400 establishes effective control of the appliance 400 by transmitting an RF signal 202 through the barrier object to the RCIU 200. The example barrier object 504 is sufficiently opaque to block an optical frequency signal 204, for example an infrared light signal from a dedicated optical remote control 510, from passing through the barrier object and being detected and recognized by the optical signal receiver 502 on the appliance. The RCIU 200 captures an appliance control code from the RF signal 202 and communicates the appliance control code to the appliance 400 in an optical frequency signal 204 transmitted over the example line-of-sight path 512 between the appliance and the RCIU.

FIG. 5 further represents an example of a first smart phone 506 and a second smart phone 508 attempting approximately simultaneous remote control of the appliance 400. The GUI 332 and associated program instructions 328 for the first smart phone 506 optionally differ from the GUI and program instructions for the second smart phone 508 according to the user IDs for each smart phone 300. Similarly, the list of control code restrictions 320 for the first smart phone 506 may differ from the list of control code restrictions 320 for the second smart phone 508. The user ID 314 associated with the first smart phone 506 optionally has a higher priority in the RCIU for transmitting commands to the appliance 400 than the user ID associated with the second smart phone 508, giving the user of the first smart phone the option of overriding selections made by the user of the second smart phone, and optionally enabling the RCIU to prioritize requests from the first smart phone over requests from the second smart phone when signals from both phones are received at about the same time by the RCIU.

Unless expressly stated otherwise herein, ordinary terms have their corresponding ordinary meanings within the respective contexts of their presentations, and ordinary terms of art have their corresponding regular meanings.

What is claimed is:

1. A remote control interface unit, comprising:
an applications program configured for execution on a smart phone, said applications program configured to store in said smart phone a transmitted user identification value, an appliance identification value, a list of appliance control codes, and a list of control code restrictions for limiting appliance functions for said transmitted user identification value by an appliance with said appliance identification value;
a processor;
a memory connected for data communication with said processor;
a stored user identification value stored in said memory;
said appliance identification value further stored in said memory;
a radio frequency transceiver connected for data communication with said processor, said radio frequency transceiver configured to receive a radio frequency signal including an appliance control code from said list of appliance control codes and a transmitted user identification value; and
an optical frequency interface connected for data communication with said processor, said optical frequency interface comprising a transmitter including a light emitting diode, said transmitter configured to output from said light emitting diode an optical frequency signal including said appliance control code;
wherein said processor is configured to extract said appliance control code from said radio frequency signal, send said appliance control code to said optical frequency interface, and initiate transmission to said appliance having said appliance identification value by said light emitting diode of said optical frequency signal including said appliance control code when said stored user identification value and said transmitted user identification value are a same value.

2. The remote control interface unit of claim 1, wherein said radio frequency transceiver is configured to receive said radio frequency signal including said appliance control code and said transmitted user identification value from said smart phone.

3. The remote control interface unit of claim 1, said optical frequency interface further comprising a receiver including a light sensor, said receiver configured to receive an optical frequency signal transmitted from said appliance, and said processor configured to extract from said optical frequency signal transmitted from said appliance a response to said appliance control code.

4. The remote control interface unit of claim 3, wherein said processor is configured to send said response to said radio frequency transceiver and initiate communication of said response to said smart phone.

5. The remote control interface unit of claim 1, wherein said light emitting diode transmits said appliance control code with a light frequency light outside a portion of the electromagnetic spectrum visible to humans.

6. The remote control interface unit of claim 1, wherein said remote control interface unit does not include components configured for communicating with a cellular telephone network.

7. The remote control interface of claim 1, further comprising said list of control code restrictions stored in said memory and said processor configured to determine from said list of control code restrictions stored in said memory which appliance functions can be performed by said appliance with said appliance identification value for said user identification value.

* * * * *